United States Patent [19]

Chono et al.

[11] 4,208,320

[45] Jun. 17, 1980

[54] FLAME RETARDANT RESIN COMPOSITION COMPRISING REACTION PRODUCT OF POLYGUANAMINE COMPOUND AND CYANURIC OR ISOCYANURIC ACID COMPOUND

[75] Inventors: Masazumi Chono; Kunio Maeda, both of Yokohama; Kunio Saito, Chigasaki, all of Japan

[73] Assignee: Asahi Kasei Kogyo Kabushiki Kaisha, Osaka, Japan

[21] Appl. No.: 936,044

[22] Filed: Aug. 23, 1978

[30] Foreign Application Priority Data

Aug. 30, 1977 [JP] Japan .................................. 52-103154
Aug. 30, 1977 [JP] Japan .................................. 52-103155

[51] Int. Cl.$^2$ .............................................. C08K 5/29
[52] U.S. Cl. ............................. 260/45.8 NT; 252/8.1; 544/207

[58] Field of Search ........... 106/15 FP; 260/45.8 NT; 544/207; 252/8.1

[56] References Cited

U.S. PATENT DOCUMENTS

| 4,001,177 | 1/1977 | Tsutsumi et al. ............... 260/45.8 A |
| 4,122,269 | 10/1978 | Chono et al. ......................... 544/207 |

*Primary Examiner*—Howard E. Schain
*Assistant Examiner*—W. Thompson
*Attorney, Agent, or Firm*—Armstrong, Nikaido, Marmelstein & Kubovcik

[57] ABSTRACT

A resin composition comprising as flame retardant 3 to 50% by weight of a reaction product of a polyguanamine compound and a cyanuric or isocyanuric acid compound has excellent flame retardancy, excellent physical properties and excellent molding characteristics (no mold deposit nor bleed out).

7 Claims, No Drawings

FLAME RETARDANT RESIN COMPOSITION COMPRISING REACTION PRODUCT OF POLYGUANAMINE COMPOUND AND CYANURIC OR ISOCYANURIC ACID COMPOUND

This invention relates to flame retardant resin compositions having little toxicity and excellent in heat resistance, mechanical properties and molding characteristics. More particularly, it relates to flame retardant resin compositions having little toxicity and excellent in physical properties and molding characteristics, which comprise a resin having added thereto at least one of the salts of tri- or di-guanamine compounds with cyanuric or isocyanuric acid or a derivative thereof.

Several methods have heretofore been proposed for making a resin flame retardant. The most widely used technique is the incorporation of a flame retardant into the resin. Known flame retardants include halogen-containing compounds and nitrogen-containing compounds. However, the halogen-containg flame retardants present problems concerning toxicity and molding characteristics, while the nitrogen-containing ones, although the problems associated with toxicity are few, have disadvantages of so-called mold deposit phenomenon—deposition of the sublimed flame retardant on the wall of mold cavity during molding—and so-called bleed-out phenomenon—bleeding of the flame retardant through the surface of a molded article on absorption of moisture. Thus, the actual circumstances are that the development of a flame retardant resin having no such practical difficulties are eagerly awaited in order to answer the social requirement for the improvement in safety of the electrical as well as electronic appliances.

The present inventors have conducted extensive studies to overcome the above-noted difficulties of the conventional flame retardants and, as a result, have found that by using as a flame retardant a salt of triguanamine compound having in the molecule three guanamine rings or of a diguanamine compound having in the molecule two guanamine rings with cyanuric acid, isocyanuric acid or a derivative thereof, said flame retardant per se being highly heat resistant, it is possible to provide a flame retardant resin composition which has an improved flame retardancy, yet shows neither mold deposit during molding nor bleed-out on the surface of molded article.

Attempts have long been made to incorporate into a resin cyanuric acid for the purpose of improving heat resistance and imparting flame retardancy to the resin. The addition of cyanuric acid for the purpose of imparting flame retardancy to a resin is described in Japanese Patent Application Kokai (Laid-open) Nos. 39,750/76 and 39,751/76. However, in the polyamide compositions disclosed in these laid-open patent applications, the above-mentioned disadvantages of mold deposit, bleed out and the like have not been solved, and the compositions have been unsatisfactory in practice.

Further, salts of monoguanamine compounds (for example, acetoguanamine and benzoguanamine) with cyanuric acid have been tested for the flame retardant property. It has been found that although some improvement is observed as compared with the monoguanamine itself, the salt was still unsatisfactory in mold deposit and bleed out for practical use, partly because of the subliming tendency of the monoguanamine from which the salt had been derived.

To the contrary, triguanamine and diguanamine compounds from which the salts used in the composition of this invention are derived have no tendency to sublime and are also heat resistant. Accordingly, the salts are highly thermally stable and show no tendency of mold deposit or bleed out, and thus answering the social requirements.

It is an object of this invention to a flame retardant resin composition having no tendency of mold deposit and bleed out.

It is another object of this invention to provide a highly practicable, flame-retardant resin composition.

Other objects and advantages of this invention will become apparent from the following description.

According to this invention, there is provided a flame retardant resin composition comprising 50 to 97% by weight of a resin and 3 to 50% by weight of a reaction product of a polyguanamine compound represented by the general formula (A),

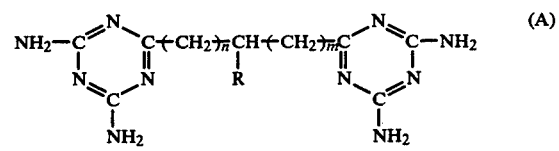

wherein n and m each represent zero or a positive integer;
and R is

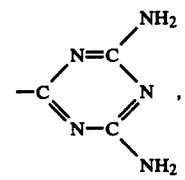

—CN, —COOH, —CH$_2$NH$_2$, —CONH$_2$ or

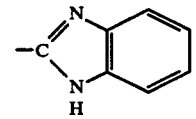

when n=2 and m=3, or R is H when n is other than 2, m is other than 3 and n+m=1-6, and a cyanuric acid compound represented by the general formula (B) or an isocyanuric acid compound represented by the general formula (C),

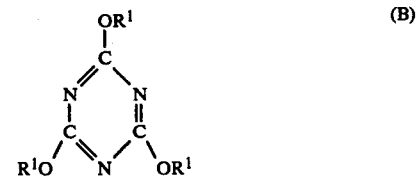

-continued

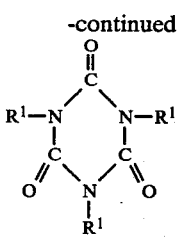
(C)

wherein each $R^1$ represents hydrogen, an alkyl group having 1 to 3 carbon atoms, an oxyalkyl group having 1 to 3 carbon atoms, or a phenyl group; at least one of $R^1$'s is hydrogen or an oxyalkyl group having 1 to 3 carbon atoms; and $R^1$'s in the same molecule may be the same or different.

The polyguanamine compounds used in this invention are represented by the general formula (A) mentioned above, and 1,3,6-tris(4,6-diamino-1,3,5-triazin-2-yl)-hexane, which is a compound (A) wherein

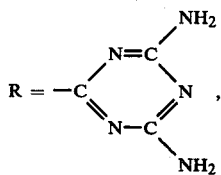

is a triguanamine compound usually in the form of white powder which is obtainable by the reaction between 3 moles of dicyandiamide and 1 mole of 1,3,6-tricyanohexane which is, in turn, prepared by the electrolytic trimerization of acrylonitrile [German Offenlegungsschrift 2733564 (laid-open Feb. 2, 1978)].

1,6-Bis(4,6-diamino-1,3,5-triazin-2-yl)-3-nitrile-hexane, which is a compound (A) wherein R=—CN, is a diguanamine compound which is obtainable by reacting in a known manner 1 mole of 1,3,6-tricyanohexane with 2 moles of dicyandiamide.

Diguanamine compounds represented by the general formula (A), wherein R is —COOH, —CH$_2$NH$_2$, —CONH$_2$ and

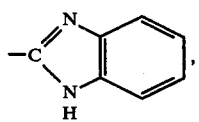

are obtained by converting -CN group of the above-noted 1,6-bis(4,6-diamino-1,3,5-triazin-2-yl)-3-nitrile-hexane into a desired group in a known manner.

Diguanamine compounds of the general formula (A), wherein R is hydrogen and n+m=1 to 6, are commercially available or can be prepared by known methods [Chemistry and Industry, 1047 (Aug. 3, 1968) and Bulletin of the Chemical Society, Japan, Vol. 38, No. 11, 1820 (1965)].

Examples of individual diguanamine compounds are 1,6-bis(4,6-diamino-1,3,5-triazin-2-yl)-hexane, 1,6-bis(4,6-diamino-1,3,5-triazin-2-yl)-3-nitrile-hexane, 1,6-bis(4,6-diamino-1,3,5-triazin-2-yl)-3-carboxyl-hexane, 1,6-bis(4,6-diamino-1,3,5-triazin-2-yl)-3-aminomethyl hexane, 1,6-bis(4,6-diamino-1,3,5-triazin-2-yl)-3-amidohexane, 1,6-diamino-1,3,5-triazin-2-yl)-3-benzimidazolylhexane, 1,4-bis(4,6-diamino-1,3,5-triazin-2-yl)-butane and 1,2-bis(4,6-diamino-1,3,5-triazin-2-yl)-ethane, and the like.

Of the polyguanamine compounds represented by the general formula (A), diguanamine compounds all have approximately equivalent effects, whereas triguanamine compounds are superior to the diguanamine compounds in molding characteristics of the resin composition and flame retardance of the molded article.

The cyanuric acid compounds (B) and isocyanuric acid compounds (C) which react with the compounds (A) to form the reaction products used in this invention are, for example, cyanuric acid, methyl cyanurate, phenyl cyanurate, diphenyl cyanurate, tris(2-hydroxyethyl) cyanurate, isocyanuric acid, methyl isocyanurate, phenyl isocyanurate, diphenyl isocyanurate, tris(2-hydroxyethyl) isocyanurate, and the like.

In the reaction product of a polyguanamine compound (A) and a cyanuric acid compound (B) or an isocyanuric acid compound (C), salt is formed by bonding between the basic group, namely the amino group, in the guanamine and the acidic hydrogen (hydrogen in $R^1$ or in the hydroxyl group of oxyalkyl group) in cyanuric acid compound or isocyanuric acid compound. The formation of the salt is confirmed by the identification of ammonium ion from infrared absorption spectrum and by the elementary analysis.

If a polyguanamine compound (A) and a cyanuric acid compound (B) or isocyanuric acid compound (C) are used in place of their reaction product, the object of this invention cannot be achieved because of both marked mold deposit and bleed out (see Comparative Example 3 which appears hereinafter). Therefore, it is essential in this invention to use the reaction product.

Although the molar ratio to be used in reacting a polyguanamine with a cyanuric or isocyanuric acid compound may be varied depending upon the number of basic groups and that of acidic hydrogen atoms, a suitable range of the acid component is 0.1 to 6, preferably 0.1 to 3 moles per mole of a triguanamine compound and 0.1 to 4, preferably 0.1 to 2 moles per mole of a diguanamine compound in view of the flame-retarding performance and the stability of the formed salt.

The salt is obtained by dissolving or suspending a guanamine compound, which is a basic substance, and one or more cyanuric or isocyanuric acid compounds, which are acidic substances, in water or an organic solvent, allowing both components to react, filtering the resulting salt, and then purifying by recrystallization or washing with water.

The solvents used in the above reaction include dialkyl sulfoxides such as dimethyl sulfoxide and diethyl sulfoxide; β-methoxyethanol, β-ethoxyethanol, β-butoxyethanol, β-methoxypropanol, β-ethoxypropanol, β-butoxypropanol β-methoxybutanol, β-ethoxybutanol, isoamylalcohol, primary amyl alcohol, secondary amyl alcohol, benzyl alcohol, dimethylformamide, dimethylacetamide, N-methyl-2-pyrrolidone, pyridine, and water.

The reaction temperature is 50° to 180° C., preferably 100° to 160° C. If the temperature is below 50° C., the rate of reaction is too low, while if the temperature exceeds 180° C., degradation of the amino group takes place. The reaction time is generally 10 to 180 minutes. The reaction pressure may be subatmospheric, atmospheric, or superatmospheric. The reaction may be carried out in either the homogeneous system or heterogeneous system, but from the standpoint of yield, the homogeneous system reaction is preferred.

In this invention, the salt of a polyguanamine compound with a cyanuric or isocyanuric acid compound is incorporated in an amount of 3 to 50%, preferably 4 to 30% by weight into a resin. If the incorporated amount is less than 3% by weight, the flame retardance becomes insufficient, while if it exceeds 50% by weight, both the molding characteristics and the mechanical properties are so much determined that the resin composition becomes unsuitable for practical use.

In practicing this invention, by adding an aromatic carboxylic acid to the salt of this invention, it is possible to further improve the flame retardancy, that is, self-extinguishing property and to reduce the average combustion time.

The term "aromatic carboxylic acid" used herein means not only a free acid but also an ester and metal salt thereof. Preferred alcohol moieties of the esters are hydrocarbinols having 1 to 6 carbon atoms and preferred salts are those with alkali metals such as sodium and potassium. Suitable aromatic carboxylic acids are those having a melting point or a decomposition point of 200° C. or more, such as, for example, isophthalic acid, terephthalic acid, trimellitic acid and pyromellitic acid. These acids can be used each alone or in combination of two or more. The amount of the aromatic carboxylic acid added is 0.1 to 5%, preferably 0.3 to 2% by weight. If the amount is less than 0.5% by weight, the effect of the aromatic carboxylic acid is not sufficiently exhibited, while if it exceeds 5% by weight, the resin composition becomes deteriorated, resulting in undesirable decrease in mechanical properties.

The resins used in the resin compositions of this invention include homopolyamides, representatives of which are nylon 6-6, nylon 6-10, nylon 6-12, nylon 6, nylon 11 and nylon 12, mixtures of these homopolyamides, and copolyamides; linear saturated polyesters such as polyethylene terephthalate and polytetramethylene terephthalate; polyolefins such as polyethylene and polypropylene; polyacrylates such as polymethyl acrylate and polymethyl methacrylate; other thermoplastic resins such as polyphenylene oxide, modified polyphenylene oxide, polystyrene, ABS resin, styrene-acrylonitrile copolymer; polycarbonate, polyacetal homopolymer and polyacetal copolymer; further, thermosetting resins, such as thermosetting polyesters derived from diallyl phthalate, diallyl terephthalate, and diallyl 2,6-naphthalenedicarboxylate; polyurethanes; and epoxy resins. Of these resins, most preferred are polyamide resins. The preferred polyamide resins include various known polyamides having recurring carboxylic amide linkages in the polymer chain, which are obtained by polymerization of lactams, by polycondensation of aminocarboxylic acids or salts formed from diamines and dicarboxylic acids, or by copolymerization of these monomers with one another. Examples thereof are nylon 6, nylon 6—6, nylon 11, nylon 12, nylon 6-10, nylon 6-12 and nylon 6-6/6 copolymer.

So long as the aforementioned merits of the present invention are not injured, the flame retardant resin composition of this invention may contain dyes and pigments, lubricants, fillers, reinforcements, plasticizers, stabilizers, antistatics and other additives. Suitable additives are glass fiber and carbon fiber for the reinforcement; higher fatty acids, metal salts thereof and bisamides for the lubricant; talc, clay, calcined clay, mica, calcium silicate, calcium carbonate, calcium sulfate, glass beads, molybdenum disulfide and graphite for the filler; various phosphoric esters, sulfonic acids, quaternary ammonium salts, polyhydric alcohol esters, alkylamides, alkylamines, and conductive carbon black for the antistatic.

In practicing this invention, the compounding of the flame retardant with a resin can be carried out by applying any of the known techniques. However, in order to obtain a flame retardant resin composition capable of exhibiting full advantages of the flame retardant of this invention, the internal mixing by kneading is preferred. In the case of a thermoplastic resin, the resin in pellet or powder form is blended with the flame retardant of this invention at room temperature and then melt-formed by use of a melt-forming machine, for example, an extruder or the like; alternatively, the resin is first blended with the flame retardant and the mixture is then pelletized and melt-formed. It is also feasible to prepare first a master batch of a resin containing a flame retardant in a high concentration, knead together the master batch with the plain resin in molten state and form into an intended article. In the case of a thermosetting resin, it is preferable to blend the flame retardant with a monomer, a prepolymer, or a dope or compound containing the monomer or prepolymer and reinforcements or the like, and then form the mixture into an article.

This invention is illustrated below in detail with reference to Examples, but the invention is not limited thereto. In the Examples, the tests were performed in the following way:

(1) Flammability: A vertical burning test was performed on a test specimen, 1/16 inch in thickness, in accordance with the standard method UL 94 of Underwriters' Laboratories, Inc., U.S.A.

(2) Molding characteristics: Mold deposit was evaluated by inspecting the mold during the molding of a specimen for the flammability test by means of a 1 oz. injection molding machine. Bleed out was tested by keeping for 10 days a specimen for the flammability test in a hot-air oven at 150° C. and in an atmosphere of 80° C. and 80% RH and inspecting the surface of the specimen.

(3) Mechanical properties: Tensile strength was measured according to ASTM D638, and the Izod impact strength (notched) according to ASTM D256.

EXAMPLE 1

Synthesis of 1,3,6-Tris(4,6-diamino-1,3,5-triazin-2-yl)-hexane

To 750 g of dimethylsulfoxide as solvent were added 322 g (2 moles) of 1,3,5-tricyanohexane and 554.4 g (6.6 moles) of dicyandiamide, and then 112 g of 50% aqueous potassium hydroxide solution as catalyst was added thereto. The resulting mixture was heated at 100° C. for 3 hours with stirring under a nitrogen atmosphere to allow the reactants to react with each other. After the reaction, the whole of the reaction mixture was cooled to 25° C. to precipitate the reaction product, which was filtered to obtain crude product. This crude product was purified by repeating three times the washing with hot water and filtering, and thereafter drying the finally filtered product, to obtain 650 g of 1,3,6-tris(4,6-diamino-1,3,5-triazin-2-yl)-hexane (referred to hereinafter as TG) in the form of white powder.

Synthesis of Triguanamine Cyanurate

To 10 liters of water at 80° C. were added 1 mole (413 g) of TG thus obtained and 1 mole (129 g) of cyanuric acid, and the resulting solution was subjected to reaction with stirring for about 3 hours, upon which the salt thus formed precipitated. The salt thus precipitated was separated by filtration, washed with water and then dried to obtain 488 g (90.1%) of TG cyanurate. The salt was identified by IR and elementary analysis:

Elementary analysis:
Calcd.: C, 39.8%; N, 46.5%; H, 4.8%; O, 8.9%;
Found: C, 40.0%; N, 46.7%; H, 4.8%; O, 8.5%. IR: 3400 cm$^{-1}$, 1330 cm$^{-1}$ (ammonium ion)

In a tumber, 4.5 kilograms of nylon 6—6 pellets (Leona 1300S, a trade name of Asahi Kasei Kogyo Kabushiki Kaisha) and 0.5 kg of the salt obtained above were mixed with each other. By use of an extruder, the mixture was kneaded, extruded and granulated to obtain a resin composition in pellet form. The pellets were injection molded into test specimens which were evaluated for UL flammability and molding characteristics. The results obtained were as shown in Table 1. It is seen from Table 1 that the resin composition obtained in this Example is excellent in flame retardancy and molding characteristics.

EXAMPLE 2

One mole of TG and 3 moles of cyanuric acid were added to 2.5 liters of dimethyl sulfoxide and heated with stirring in an oil bath to 160° C. to allow the mixture to react at this temperature for about 30 minutes. The reaction mixture was cooled to room temperature, upon which the salt precipitated. The salt was separated by filtration, recrystallized from 2.0 liters of dimethyl sulfoxide at 140° C., collected by filtration, washed with about 5.0 liters of water, and dried to obtain TG cyanurate, yield 92.5%.

The salt was identified as follows:
Elementary analysis:
Calcd.: C, 36.0%; N, 42.0%; H, 4.0%; O, 18.0%;
Found: C, 35.8%; N, 41.7%; H, 3.8%; O, 18.7%. IR absorption: 3400 cm$^{-1}$, 1330 cm$^{-1}$ The salt was evaluated for UL flammability and molding characteristics in the same manner as in Example 1. The results obtained were as shown in Table 1.

Examples 3 and 4 and Comparative Examples 1 to 3

Nylon 6—6 compositions containing varying amounts of the same flame retardant as used in Example 1 were tested for UL flammability and molding characteristics in the same manner as in Example 1. The results were as shown in Table 1.

Table 1

| Example No. | Flame retardant (triguanamine/cyanuric acid molar ratio) | Amount added (% by wt.) | Mold deposit | Bleed out | UL 94 Flammability |
|---|---|---|---|---|---|
| 1 | TG cyanurate (1/1) | 10 | None | None | V-0 |
| 2 | TG cyanurate (1/3) | 10 | " | " | V-0 |
| 3 | TG cyanurate (1/1) | 5 | " | " | V-0 |
| 4 | TG cyanurate (1/1) | 15 | " | " | V-0 |
| Comparative Example 1 | None | — | — | — | V-2 |
| Comparative Example 2 | Cyanuric acid | 5 | Heavy | Observed | — |
| Comparative Example 3 | TG + cyanuric acid (1:1)* | 5 | " | " | — |

Note: *Simple mixture of TG and cyanuric acid

EXAMPLE 5

In a manner similar to that in Example 1, 1 mole of 1,4-bis(4,6-diamino-1,3,5-triazin-2-yl)-butane and 2 moles of isocyanuric acid were allowed to react to obtain a salt, adipoguanamine isocyanurate, yield 88.7%. Elementary analysis of the salt gave the following results:

Calcd.: C, 36.1%; N, 41.7%; O, 18.1%; H, 4.1%;
Found: C, 36.0%; N, 42.0%; O, 18.0%; H, 4.0%.

In the same manner as in Example 1, a resin composition as shown in Table 2 was prepared and injection molded into test specimens which were tested for flammability, molding characteristics and mechanical properties. The results obtained were as shown in Table 2.

Examples 6 to 8 and Comparative Examples 4 and 5

In a manner similar to that in Example 5, nylon 6—6 compositions containing varying amounts of adipoguanamine isocyanurate were prepared and molded into test specimens which were evaluated. The results were as shown in Table 2. It is seen from Table 2 that when the flame retardant content is less than 3% by weight, the flammability is unsatisfactory, while when it exceeds 50% by weight, mechanical properties are deteriorated.

Table 2

| Example No. | Resin composition | | Flammability (1/16 inch) | Molding Characteristics | | Mechanical properties | | |
|---|---|---|---|---|---|---|---|---|
| | Resin | Flame retardant (content in %) | | Mold deposit | Bleed out | Tensile strength (kg/cm$^2$) | Elongation (%) | Izod (kg . cm/cm) |
| 5 | Nylon 6—6 (Leona 1300S) | Adipoguanamine diisocyanurate (10) | V-0 | None | None | 820 | 18 | 4.2 |
| 6 | Nylon 6—6 (Leona 1300S) | Adipoguanamine diisocyanurate (4) | " | " | " | 820 | 25 | 4.5 |
| 7 | Nylon 6—6 (Leona 1300S) | Adipoguanamine diisocyanurate (20) | " | " | " | 810 | 15 | 4.0 |
| 8 | Nylon 6—6 (Leona 1300S) | Adipoguanamine diisocyanurate | " | " | " | 790 | 10 | 3.8 |

Table 2-continued

| Example No. | Resin composition Resin | Flame retardant (content in %) | Flamma-bility (1/16 inch) | Molding Characteristics Mold deposit | Bleed out | Mechanical properties Tensile strength (kg/cm$^2$) | Elonga-tion (%) | Izod (kg · cm/cm) |
|---|---|---|---|---|---|---|---|---|
| Comparative Example 4 | Nylon 6—6 (Leona 1300S) | Adipoguanamine diisocyanurate (40) (2) | V-2 | " | " | 830 | 30 | 4.7 |
| Comparative Example 5 | Nylon 6—6 (Leona 1300S) | Adipoguanamine diisocyanurate (55) | V-0 | " | " | 700 | 4 | 2.8 |

EXAMPLE 9

In a manner similar to that in Example 1, 1 mole of TG and 1 mole of dimethylcyanuric acid were reacted to prepare a salt, TG dimethylcyanurate, yield 89.5%. Using nylon 6—6 (Leona 1300S), a resin composition as shown in Table 3 was prepared and tested for flammability and molding characteristics. The results were as shown in Table 3.

EXAMPLE 10

In a manner similar to that in Example 1, 1 mole of TG and 1 mole of monophenyl cyanurate were reacted to prepare a salt, TG phenylcyanurate, yield 87.6%. Using nylon 6—6 (Leona 1300S), a resin composition as shown in Table 3 was prepared and tested for flammability and molding characteristics. The results were as shown in Table 3.

EXAMPLE 11

In a manner similar to that in Example 1, 1 mole of TG and 1 mole of tris(2-hydroxyethyl)isocyanurate were reacted to prepare a salt, TG tris(2-hydroxyethyl)-isocyanurate, yield 85.2%. Using nylon 6—6 (Leona 1300S), a resin composition as shown in Table 3 was prepared and tested for flammability and molding characteristics. The results obtained were as shown in Table 3.

Table 3

| Example No. | Flame retardant | Amount added (%) | Mold deposit | UL Flamma-bility (1/16 inch) |
|---|---|---|---|---|
| 9 | TG dimethyl-cyanurate | 10 | None | V-0 |
| 10 | TG monophenyl-cyanurate | 10 | " | V-0 |
| 11 | TG tris(2-hydroxy-ethyl)-iso-cyanurate | 10 | " | V-0 |
| Comparative Example 6 | Dimethylcyanuric acid | 10 | Heavy | — |
| Comparative Example 7 | Monophenyl-cyanuric acid | 10 | " | — |
| Comparative Example 8 | Tris(2-hydroxy-ethyl)-cyanuric acid | 10 | " | — |

EXAMPLE 12 TO 17

In a manner similar to that in Example 5, nylon 6—6 (Leona 1300S) was mixed with each of the flame retardants shown in Table 4. As is seen from the test results shown in Table 4, all of the resin compositions were satisfactory in flammability and molding characteristics.

Table 4

| Example No. | Resin Composition Resin | Flame retardant (content: 10% by wt.) | Flamma-bility (1/16 inch) | Molding Characteristics Mold deposit | Bleed out |
|---|---|---|---|---|---|
| 12 | Nylon 6—6 | 1,6-Bis(4,6-diamino-1,3,5-triazin-2-yl)-hexane diisocyanurate | V-0 | None | None |
| 13 | " | 1,2-Bis(4,6-diamino-1,3,5-triazin-2-yl)-ethane diisocyanurate | " | " | " |
| 14 | " | 1,6-Bis(4,6-diamino-1,3,5-triazin-2-yl)-3-nitrile-hexane diisocyanurate | " | " | " |
| 15 | " | 1,6-Bis(4,6-diamino-1,3,5-triazin-2-yl)-3-aminomethyl-hexane diisocyanurate | " | " | " |
| 16 | " | 1,6-Bis(4,6-diamino-1,3,5-triazin-2-yl)-hexane bis(trimethyl-isocyanurate) | " | " | " |
| 17 | " | 1,6-Bis(4,6-diamino-1,3,5-triazin-2-yl)-hexane bis(trimethyl-cyanurate) | " | " | " |

EXAMPLE 18

With 10 liters of water were mixed 0.24 mole of TG and 0.24 mole of cyanuric acid with stirring at 80° C. and the mixture was allowed to react for 3 hours, upon which the resulting salt precipitated. This salt, TG cyanurate, was separated by filtration, washed with water and dried (yield 90.5%).

In a tumbler, 0.5 kilogram of the salt, 4.5 kg of dry pellets of nylon 6-6/6 copolymer (Leona 9200, a trade name of Asahi Kasei Kogyo Kabushiki Kaisha) containing 10% by weight of nylon 6 component, and 50 g of isophthalic acid were mixed. By using an ordinary extruder, the mixture was kneaded, extruded and granulated to obtain a resin composition in pellet form. The pellets were molded by means of an injection molding machine into a test specimen which tested for flammability and molding characteristics. As shown in Table 5, by the addition of isophthalic acid, the average combustion time was reduced, indicating an improved flame retardancy.

Table 5

| Example No. | Resin composition | | | Flammability (1/16") | |
|---|---|---|---|---|---|
| | Nylon 6-6/6 (90/10) (% by wt.) | TG-CY*[1] (% by wt.) | Isophthalic acid (% by wt.) | Average Combustion Time*[2] (second) | UL class |
| 18 | 90 | 9 | 1 | 0.2 | V-0 |
| Comparative Example 9 | 90 | 10 | — | 1.9 | V-0 |

Note: *[1] 1,3,6-Tris(4,6-diamino-1,3,5-triazin-2-yl)-hexane monocyanurate
*[2] By UL standard test method (average of combustion time values of 5 test specimens)

EXAMPLE 19

One mole of 1,4-bis(4,6-diamino-1,3,5-triazin-2-yl)-butane and one mole of cyanuric acid were allowed to react in a manner similar to that in Example 1 to obtain adipoguanamine cyanurate, yield 88.5%. In a manner similar to that in Example 1, using nylon 6—6 (Leona 1300S) and the above salt a resin composition was prepared and molded into test specimens, which were then tested for flammability and molding characteristics. The test results were as shown in Table 6.

EXAMPLE 20

To 700 g of dimethyl sulfoxide as solvent were added 161 g (1 mole) of 1,3,6-tricyanohexane and 176 g (2.1 mole) of dicyandiamide, and 68 g of sodium ethylate as catalyst was then added thereto. The resulting mixture was heated at 130° C. for 3 hours with stirring under a nitrogen atmosphere to react the reactants. After the reaction, the whole of the reaction mixture was cooled to 25° C., upon which the reaction product precipitated. This was filtered to obtain a crude product. This crude product was purified by repeating three times washing with hot water and filtering, and then drying the finally filtered product, thereby obtaining 255.2 g of 1,6-bis(4,6-diamino-1,3,5-triazin-2-yl)-3-nitrilehexane.

In the same manner as in Example 1,1 mole of the thus obtained 1,6-bis(4,6-diamino-1,3,5-triazin-2-yl)-3-nitrile-hexane was reacted with 1 mole of cyanuric acid to obtain a corresponding salt, yield 82.6%.

In the same manner as in Example 1, a resin composition containing nylon 6—6 (Leona 1300S) and the salt in a proportion as shown in Table 6 is prepared, and then molded into test specimens, which were then subjected to measurement of flame retardancy and molding characteristics. The results obtained were as shown in Table 6.

Table 6

| Example No. | Flame retardant | Amount added (%) | Mold deposit | UL Flammability (1/16") |
|---|---|---|---|---|
| 19 | Adipoguanamine cyanurate | 10 | None | V-0 |

Table 6-continued

| Example No. | Flame retardant | Amount added (%) | Mold deposit | UL Flammability (1/16") |
|---|---|---|---|---|
| 20 | 1,6-Bis(4,6-diamino-1,3,5-triazin-2-yl)-3-nitrile-hexane cyanurate | 10 | None | V-0 |

EXAMPLE 21

To 500 g of dimethyl sulfoxide were added 0.24 mole of TG and 1.44 moles of cyanuric acid and the mixture was heated with stirring on an oil bath to 160° C. and the reaction was allowed to proceed for 30 minutes at this temperature. The reaction mixture was cooled to room temperature, upon which the reaction product precipitated. This product was filtered to obtain a salt, TG cyanurate, yield 75.2%. The salt was identified by IR and elementary analysis.

Elementary analysis:
Calc.: C, 33.4%; N, 38.9%; H, 3.4%; O, 24.3%; Found: C, 33.6%; N, 39.3%; H, 3.6%; O, 23.5%. IR: 3400 cm$^{-1}$, 1330 cm$^{-1}$ (ammonium ion)

A resin composition was prepared using the above salt and nylon 6—6 (Leona 1300S) in a manner similar to that in Example 1 and molded into test specimens, which were then tested for flammability and molding characteristics. The UL flammability corresponded to UL Class V-O and no mold deposit was observed.

EXAMPLE 22

To 600 g of dimethyl sulfoxide as solvent were added 330 g (1 mole) of 1,6-bis(4,6-dimaino-1,3,5-triazin-2-yl)-3-nitrile-hexane and 27 g (1.5 moles) of water. The resulting mixture was heated at 100° C. for 2 hours with stirring to react the reactants. After the reaction, the reaction mixture was cooled to 25° C., upon which the reaction product precipitated. This was filtered to obtain a crude product. This crude product was purified by repeating three times washing with hot water and filtering, and then drying the finally filtered product to obtain 338 g of 1,6-bis(4,6-diamino-1,3,5-triazin-2-yl)-3-carboxyl-hexane.

In the same manner as in Example 1, 1 mole of the thus obtained 1,6-bis(4,6-diamino-1,3,5-triazin-2-yl)-3-carboxyl-hexane was reacted with 1 mole of tris(2-hydroxyethyl)isocyanurate to obtain a corresponding salt.

In the same manner as in Example 1, a resin composition containing nylon 6—6 (Leona 1300S) and the salt in a proportion as shown in Table 7 was prepared and then molded into test specimens, which were then subjected to measurement of flammability and molding characteristics. The results obtained were as shown in Table 7.

EXAMPLE 23

To 1 liter of 20% aqueous hydrogen chloride solution was added 330 g (1 mole) of 1,6-bis(4,6-diamino-1,3,5-triazin-2-yl)-3-nitrile-hexane, and the mixture was heated under reflux for 3 hours, and then added to 2 liters of cold water, upon which the reaction product precipitated.

The precipitates were added to 1 liter of 28% aqueous ammonia solution, and the resulting mixture was heated at 80° C. under reflux for 30 minutes. A crude product was obtained therefrom by filtration. This crude product was purified by repeating three times washing with hot water and filtering, and then drying the finally filtered product, thereby obtaining 305 g of 1,6-bis(4,6-dimaino-1,3,5-triazin-2-yl)-3-amido-hexane.

In the same manner as in Example 1, 1 mole of the thus obtained 1,6-bis(4,6-diamino-1,3,5-triazin-2-yl)-3-amido-hexane was reacted with 0.5 mole of phenyl isocyanurate to obtain a corresponding salt.

In the same manner as in Example 1, a resin composition containing nylon 6—6 (Leona 1300S) and the salt in a proportion as shown in Table 7 was prepared, and then molded into test specimens, which were then subjected to measurement of flammability and molding characteristics. The results obtained were as shown in Table 7.

EXAMPLE 24

To 1.5 liters of 40% aqueous hydrogen chloride solution were added 330 g (1 mole) of 1,6-bis(4,6-diamino-1,3,5-triazin-2-yl)-3-nitrile-hexane and 140 g (1.5 moles) of aniline, and the resulting mixture was subjected to react at 50° C. for 1 hour with stirring. The reaction mixture was thereafter neutralized with NaOH, after which 5 g of NaOBr was added thereto, and the resulting mixture was subjected to reaction at 120° C. for 30 minutes. The reaction mixture was cooled to precipitate crude reaction product. The precipitates were separated, washed with ethanol and then dried, to obtain 415 g of 1,6-bis(4,6-diamino-1,3,5-triazin-2-yl)-3-benzimidazolyl-hexane.

In the same manner as in Example 1, 1 mole of the thus obtained 1,6-bis(4,6-diamino-1,3,5-triazin-2-yl)-3-benzimidazolyl-hexane was reacted with 2 moles of cyanuric acid to obtain a corresponding salt.

In the same manner as in Example 1, a resin composition containing nylon 6-6 (Leona 1300S) and the salt in a proportion as shown in Table 7 was prepared and then molded into test specimens, which were then subjected to measurement of flammability and molding characteristics. The results obtained were as shown in Table 7.

Table 7

| Example No. | Flame retardant | Amount added (%) | Mold deposit | UL Flammability (1/16") |
|---|---|---|---|---|
| 22 | 1,6-Bis(4,6-diamino-1,3,5-triazin-2-yl)-3-carboxyl-hexane tris(2-hydroxyethyl)-isocyanulate | 13 | None | V-0 |
| 23 | 1,6-Bis(4,6-diamino-1,3,5-triazin-2-yl)-3-amido-hexane phenylisocyanurate | 15 | None | V-0 |
| 24 | 1,6-Bis(4,6-diamino-1,3,5-triazin-2-yl)-3-benzimidazolyl-hexane cyanurate | 10 | None | V-0 |

Examples 25 to 34 and Comparative Examples 10 to 19

The same flame retardant as used in Example 2 was mixed in a proportion as shown in Table 8 with a thermoplastic or thermosetting resin as shown in Table 8 to prepare test specimens.

Test specimens of the thermoplastic resin compositions were prepared in the same manner as in Example 1.

In the case of diallyl phthalate resin, the flame retardant was dissolved in the monomer for the resin heated at 60° to 80° C. After adding 2% of dicumyl peroxide, the monomer was cured between two glass sheets. Test specimens were prepared by cutting the cured material to predetermined size.

In the case of thermosetting polyester, polyglycol maleate was prepared from maleic anhydride and ethylene glycol by polycondensation. The polycondensate was admixed with styrene monomer, benzoyl peroxide, a reaction accelerator and the flame retardant and cured between two glass sheets. Test specimens were prepared by cutting the cured material to predetermined size.

In the case of polyurethane, tolylene diisocyanate, polyethylene glycol, and the flame retardant were mixed and then cured between two glass sheets. The cured material was cut to predetermined size to prepare test specimens.

In the case of epoxy resin, bisphenol-A type epoxy resin, a hardener (HHPA) and the flame retardant were mixed and heat-cured between two glass sheets. The crude material was cut to predetermined size to prepare test specimens.

Test results were as shown in Table 8. It is seen from Table 8 that various resin compositions of this invention exhibit good flame retardancy.

Table 8

| Example No. | Resin | Flame retardant (% by wt.) | UL 94 flammability |
|---|---|---|---|
| 25 | Nylon 6 (Amilan CM1017, a trade name of Toray Co.) | 10 | V-0 |
| 26 | Polyethylene terephthalate (Asahi Kasei Polyester τ sp/c = 0.73) | 10 | V-0 |
| 27 | Polytetramethylene terephthalate (Toray polyester resin 1401, Toray Co.) | 10 | V-0 |
| 28 | Noryl (modified PPO, #731, a trade name of General Electric Co.) | 20 | V-1 |
| 29 | Polyacetal (Tenac 5010, a trade name of Ashai | 30 | V-1 |

Table 8-continued

| Example No. | Resin | Flame retardant (% by wt.) | UL 94 flammability |
| --- | --- | --- | --- |
| | Kasei Kogyo K.K.) | | |
| 30 | Diallyl phthalate (DP 990NJ, a trade name of Asahi Yukizai Co.) | 10 | V-0 |
| 31 | Polyethylene (Santec J240, a trade name of Asahi Kasei Kogyo K.K.) | 20 | V-1 |
| 32 | Thermosetting polyester (Rigolac 158BQT, a trade name of Showa Kobunshi Co.) | 10 | V-0 |
| 33 | Polyurethane (tolylene diisocyanate 80) | 20 | V-1 |
| 34 | Epoxy resin (AER 661, a trade name of Asahi Kasii Kogyo K.K.) | 15 | V-0 |
| Comparative Example No. 10 | Nylon 6 (Amilan CM1017) | — | HB |
| Comparative Example No. 11 | Polyethylene terephthalate (Asahi Kasei Polyester) | — | V-2 |
| Comparative Example No. 12 | Polytetramethylene terephthalate (Toray polyester resin 1401) | — | V-2 |
| Comparative Example No. 13 | Nory (modified PPO, #731) | — | V-2 |
| Comparative Example No. 14 | Polyacetal (Tenac 5010) | — | HB |
| Comparative Example No. 15 | Diallyl phthalate (DP 990NJ) | — | V-2 |
| Comparative Example No. 16 | Polyethylene (Santec J240) | — | HB |
| Comparative Example No. 17 | Thermosetting polyester (Rigolac 158 BQT) | — | HB |
| Comparative Example No. 18 | Polyurethane (tolylene diisocyanate 80) | — | HB |
| Comparative Example No. 19 | Epoxy resin (AER 661) | — | V-1 |

EXAMPLES 35 TO 45

In a manner similar to that in Example 5, adipoguanamine diisocyanurate was mixed with each thermoplastic resin as shown in Table 9 to evaluate the resulting resin composition.

Diallyl phthalate resin was prepared by dissolving the flame retardant in the monomer (DP 900NJ) heated at 50° to 80° C., further adding 2% of dicumyl peroxide, and curing the resulting composition by heating between two glass sheets. The cured material was cut to predetermined size to prepare test specimens.

Epoxy resin was prepared by mixing bisphenol A type epoxy resin (AER 661), a hardener (HHPA) and the flame retardant, and curing the resulting mixture by heating between two glass sheets. The cured material was cut to predetermined size to prepare test specimens. As shown in Table 9, good results were obtained from all of the resin compositions.

Table 9

| | Resin composition | | |
| --- | --- | --- | --- |
| Example No. | Resin | Adipoguanamine diisocyanurate content (%) | Flammability (1/16") |
| 35 | Nylon 6 (Amilan CM1017) | 10 | V-0 |
| 36 | Polyethylene terephthalate (Asahi Kasei Polyester, ηsp/c=0.73) | 15 | " |
| 37 | Polytetramethylene terephthalate (Toray polyester resin 1401) | 15 | " |
| 38 | Polyethylene (Santec J240) | 20 | V-1 |
| 39 | Polystyrene (Styron 492, a trade name of Asahi-Dow Co.) | 20 | " |
| 40 | ABS (Styrac #100, a trade name of Asahi-Dow Co.) | 20 | " |
| 41 | Polyacetal (Tenac 5010) | 40 | " |
| 42 | Polycarbonate (Iupiron S-1000, a trade name of Mitsubishi Edogawa Chemical Co.) | 15 | V-0 |
| 43 | Modified polyphenylene oxide (Noryl #731) | 15 | " |
| 44 | Diallyl phthalate (DP 990NJ) | 10 | V-0 |
| 45 | Epoxy resin (AER 661) | 20 | " |

What is claimed is:

1. A flame retardant resin composition comprising 50 to 97% by weight of a thermoplastic or thermosetting resin and 3 to 50% by weight of a salt which is the reaction product of a polyguanamine compound represented by the general formula (A),

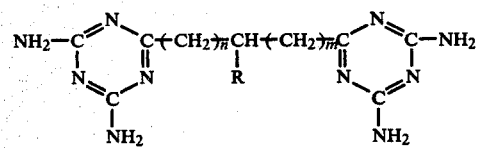

wherein n and m each represent zero or positive integer; and

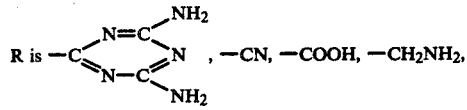

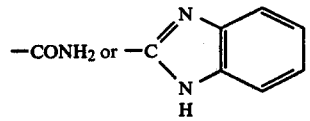

when n=2 and m=3, or R is H when n is other than 2, m is other than 3 and n+m=1-6, and a cyanuric acid compound represented by the general formula (B) or an isocyanuric acid compound represented by the general formula (C),

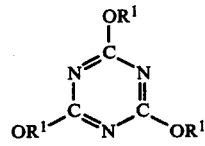

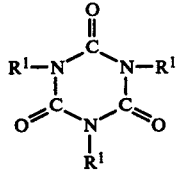

wherein each $R^1$ represents hydrogen, an alkyl group having 1 to 3 carbon atoms, an oxyalkyl group having 1 to 3 carbon atoms, or a phenyl group; at least one of the $R^1$'s is hydrogen or an oxyalkyl group having 1 to 3 carbon atoms; and $R^1$'s in the same molecule may be the same or different; and wherein, in the reaction to form said salt, the molar ratio of the acid compound (B) or (C) to the polyguanamine compound (A) is 0.1 to 6 when the polyguanamine compound is a triguanamine compound and 0.1 to 4 when the polyguanamine compound is a diguanamine compound.

2. A flame retardant resin composition according to claim 1, wherein the polyguanamine compound (A) is 1,3,6-tris(4,6-diamino-1,3,5-triazin-2-yl)-hexane.

3. A flame retardant resin composition according to claim 1, wherein the polyguanamine compound (A) is 1,2-bis(4,6-diamino-1,3,5-triazin-2-yl)-ethane, 1,4-bis(4,6-diamino-1,3,5-triazin-2-yl)-butane, 1,6-bis(4,6-diamino-1,3,5-triazin-2-yl)-hexane, 1,6-bis(4,6-diamino-1,3,5-triazin-2-yl)-3-nitrile-hexane, 1,6-bis(4,6-diamino-1,3,5-triazin-2-yl)-3-carboxyl-hexane, or 1,6-bis(4,6-diamino-1,3,5-triazin-2-yl)-3-amino-methylhexane.

4. A flame retardant resin composition according to claim 1, wherein the cyanuric acid compound (B) or isocyanuric acid compound (C) is cyanuric acid, methyl cyanurate, phenyl cyanurate, diphenyl cyanurate, tris(2-hydroxyethyl) cyanurate, isocyanuric acid, methyl isocyanurate, phenyl isocyanurate, diphenyl isocyanurate, or tris(2-hydroxyethyl) isocyanurate.

5. A flame retardant resin composition according to claim 1, wherein the resin is a thermoplastic resin or a thermosetting resin, said thermoplastic resin being selected from the group consisting of polyamides including nylon 6, nylon 6—6 and nylon 6-10, nylon 6-12, nylon 11, nylon 12, copolymers thereof, and mixtures thereof; linear saturated aromatic polyesters including polyethylene terephthalate, polytetramethylene terephthalate and polyhexamethylene terephthalate; polyphenylene oxide; modified polyphenylene oxide; polyolefins including polyethylene, polypropylene and polystyrene; polyacrylate esters including polymethyl acrylate and polymethyl methacrylate; styrene-butadiene copolymers; ABS resins; polycarbonates; and polyacetals; and said thermosetting resin being selected from the group consisting of unsaturated polyesters, polyurethanes and epoxy resins.

6. A flame retardant resin composition according to claim 1, wherein the composition further contains at least one aromatic carboxylic acid selected from the group consisting of isophthalic acid, terephthalic acid, trimellitic acid and pyromellitic acid; or an ester of these aromatic carboxylic acids or a metal salt of these aromatic carboxylic acids.

7. A flame retardant resin composition according to claim 2, wherein the resin is a polyamide resin.

* * * * *